Patented June 6, 1939

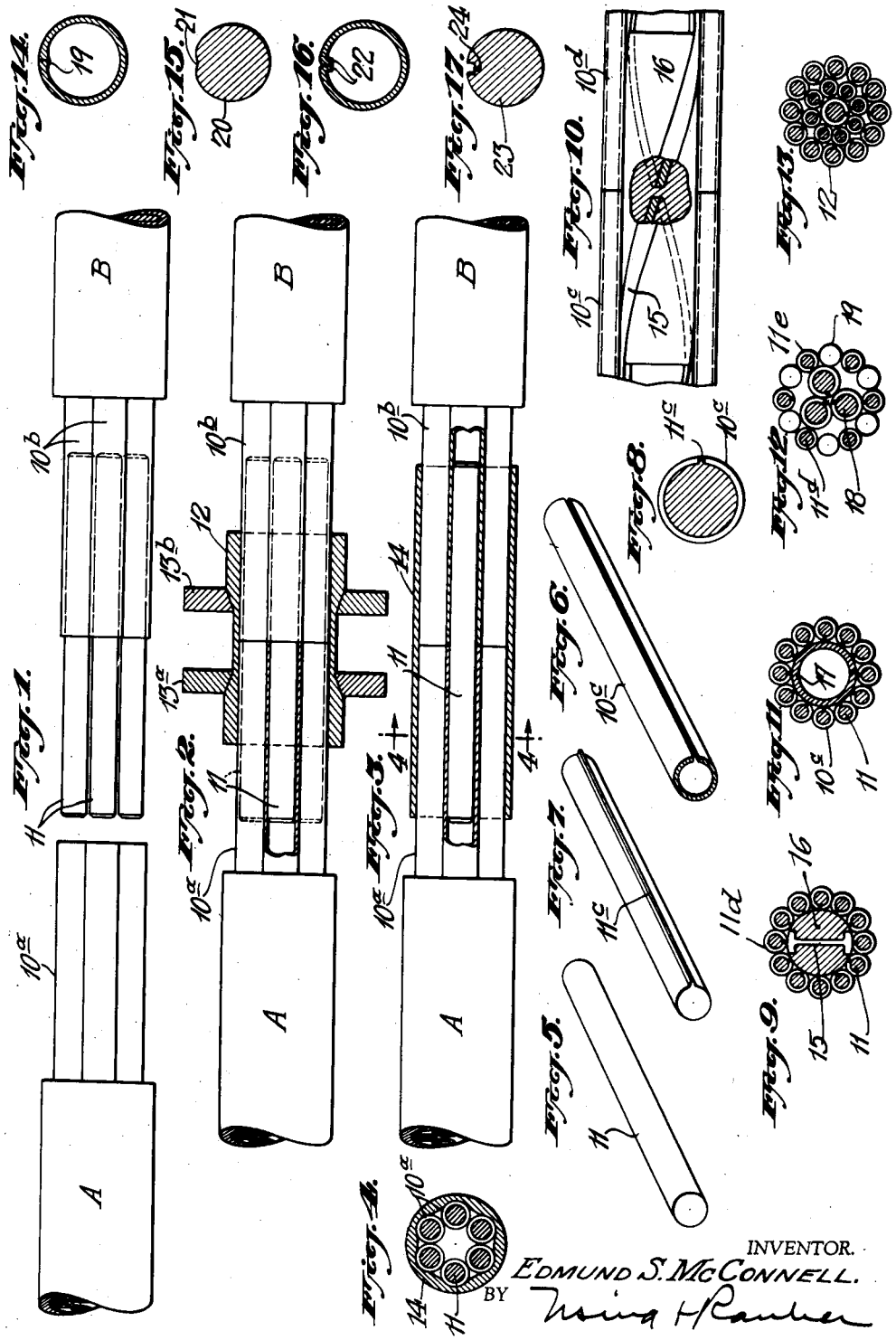

2,161,423

UNITED STATES PATENT OFFICE 2,161,423

JOINT FOR HOLLOW CABLES AND ELEMENTS THEREOF AND METHOD OF MAKING SAME

Edmond S. McConnell, Ossining, N. Y., assignor to Anaconda Wire & Cable Company, New York, N. Y., a corporation of Delaware Application October 30, 1936, Serial No. 108,435

11 Claims. (Cl. 29—148)

This invention relates to improvements in joints for hollow cables and the method of joining cables includng hollow conductors, forming elements thereof.

Heretofore, cables and conductors have been joined by constricting a sleeve about the abutted ends thereof. In one known method, the sleeve is fitted over the abutting ends of the cables or conductors to be joined, the sleeve is then subjected to a drawing operation, whereby it is elongated and slightly reduced in cross sectional area, thus forcing the metal of the connecting sleeve into intimate engagement with the conductors of the abutting ends of the cable.

Another known method is to apply a sleeve to a cable or conductor and then to subject the same to a swaging operation, so as to bring about an intimate engagement of the parts.

Such old methods are quite satisfactory when cables made of solid conductors are to be united. But, difficulties arise in the joining of tubular conductors or in the joining of cables in which the strands include tubular conductors. To overcome these difficulties, I have devised the improved method and the improved joint hereinafter described in detail.

The invention will be fully apparent from the following specification when read in connection with the accompanying drawing.

In the drawing:

Fig. 1 is a side elevation of the contiguous ends of the cable of the type to be joined in accordance with the present invention; Fig. 2 shows a step in the joining of the cables; Fig. 3 shows a cable joint embodying the present invention and joined by my novel method; Fig. 4 is a cross section on line 4—4 of Fig. 3; Fig. 5 is a detail view of a filler adapted to be inserted in the ends of hollow conductors to be joined; Fig. 6 is a detail view of a split hollow conductor of the type sometimes incorporated in cables; Fig. 7 is a detail view of a type of filler adapted to be inserted in the hollow cable strand of Fig. 6; Fig. 8 is a sectional view illustrating the filler of Fig. 7 assembled with the cable of the type shown in Fig. 6; Fig. 9 is a cross sectional view of one type of hollow cable adapted to be joined in accordance with my present invention; Fig. 10 is a side elevation partly in cross section of the type of cable shown in Fig. 9 and provided with a filler adapted to interfit with the reinforcement of such hollow cable; Figs. 11, 12 and 13 are cross sectional views of other types of hollow cables which are well adapted to be joined by the improved method and means embodying the present invention; Figs. 14 to 17 inclusive show further forms of hollow strands and the fillers used in conjunction therewith.

Referring in detail to the drawing, Fig. 1 shows a pair of cables A and B, which may be regarded as any conventional type of cable in which are employed strands $10^a$ and $10^b$ which are of tubular or hollow form. Cables with such hollow strands cannot be satisfactorily joined by conventional method and means heretofore known in the art, because, when they are united by sleeves, which are subjected to either drawing or swaging operations the tendency is to collapse the hollow conductors rather than to secure the connecting sleeve permanently thereto. To overcome this difficulty, according to my invention, I provide fillers 11, which are inserted for a predetermined distance in tne ends of the hollow conductors. For example, as shown in Fig. 1, the fillers 11 are inserted about half their length into the ends of the hollow strands $10^b$ of the cable B. Then, according to one method, I fit a sleeve 12 over the end of cable B and then telescopically engage the ends $10^a$ of the cable A with the fillers, thus bringing the parts to the position illustrated in Fig. 2. The sleeve 12 is then subjected to a drawing operation by the use of dies $13^a$ and $13^b$ of a known form of apparatus. These dies are split to facilitate engagement with the work. And when the dies are caused to recede from one another they subject the sleeve to a drawing operation which elongates the same and slightly reduces it in cross sectional area. The thus elongated sleeve is indicated at 14 in Fig. 3.

During such drawing operation, there is an inward radial pressure exerted on the cable ends. But, because I have incorporated the fillers 11 in the ends of the hollow cable strands, the tubular conductors are prevented from collapsing and thus an effective joint between the cables A and B is readily secured.

In some cases, ordinary cylindrical fillers, such as shown in Figs. 4 and 5 will be employed. In other cases, the cable strands will be in the form of split tubes $10^c$, as shown in Fig. 6. Such strands are produced by forming up a flat strip in such a way that a longitudinal slit is present therein. When such split tubular strands are employed, a filler such as shown in Fig. 7 will be employed and a rib $11^c$ will be provided on the filler so as to fit the slit, thus closing the same as shown in Fig. 8.

In Figs. 9 and 10, I have shown a hollow cable of the type having an internal twisted I-beam shaped reinforcement 15. Around this reinforcement, there are cabled a plurality of hollow or tubular strands 11$^d$. In joining a cable of this type, the strands will have fillers, such as indicated in Fig. 5, fitted to their ends. And in order to prevent relative displacement of the different strands, I provide a core filler 16, which is adapted to be interfitted with the reinforcement 15, so that, when the connecting sleeve is subjected to a drawing or swaging operation, the tendency to collapse the structure will be adequately compensated for or resisted.

In the conductor of the type illustrated in Fig. 11, the circularly arranged strands may be assumed to be the same as that shown in detail in Fig. 6. This cable includes a split tubular core 17. In joining this type of filler, sleeves will be fitted to the tubular core as well as to the strands 10$^c$.

In the type of cable shown in Fig. 12, I have illustrated three tubular fillers 18 and an outer series of tubular strands 11$^e$, which are alternated with solid wire strands 19. In joining a cable of this type, the hollow strands 11$^e$ and 18 will be fitted with suitably shaped fillers and the connecting sleeve 14 then applied. In Fig. 13, I have illustrated the type of cable in which all of the strands are of hollow tubular form. In joining this type of cable, there will be a filler, such as shown in Fig. 5 inserted in all of the strands when making the joint. While the joining sleeves will frequently be secured to the ends of the cables by subjecting such sleeves to a drawing operation, it will be readily understood that, when the fillers of my invention are used in the cable ends, connecting sleeves can be applied and made tight by subjecting such sleeves to a swaging operation or to the action of impacting forces and instead of using dies for effecting the drawing operation the sleeve can be constricted by the use of the rollers of known type of rolling tool.

Fig. 14 illustrates another type of tubular element, which may be used in the fabrication of cables composed chiefly of hollow strands. This hollow strand is formed from an originally flat strip, whose edges are thickened and brought around to abutting relationship as indicated in Fig. 14, the thickened edges being indicated at 19. When joining such hollow conductors, a filler 20, shown in Fig. 15, will be utilized, said filler being provided with a notch or groove 21 to accommodate the inwardly projecting thickened edges 19. A somewhat similar hollow conductor is shown in Fig. 16, in which the ends 22 are turned inwardly. In this case, the filler 23 joining the hollow strands will have a grooved portion 24 for the accommodation of such inturned edges.

During the stranding or formation of the types of cables herein referred to, using hollow strands, it is necessary to splice individual strands as the production of the cable progresses. Such splicing can be effected by the utilization of the fillers herein referred to, so as to secure adequate strength at the joint and also to provide a high electrical conductivity, all without materially disturbing the shape and external appearance of the tubular strands. In making such a splice, a filler of suitable material, temper, shape and length is pushed or driven for approximately half its length into the end of the tubular element, whereupon the end of another tubular strand is pushed over the projecting end of the filler until the ends of the tubular strands abut. Various means may be employed for completing the joint of such spliced strands. For example, the ends of the hollow strands may be welded to the filler by inserting them in the jaws of a known type of electric welder, equipped with dies for holding the joint at points a short distance from the abutting ends of the tubular conductors. The welding current passed through the joint from one electrode to the others will fuse the metal of the tubular conductors to the filler. Or, instead of welding, the splicing of the individual tubular conductors may be effected by coating the filler with solder or brazing metal before insertion into the ends of the tubular conductors, whereupon the parts may be subjected to sufficient heat to effect either a solder or a brazed joint.

While I have described quite precisely certain detailed embodiments of the invention and have described the specific steps in the method of making the joint it is to be understood that various modifications may be made by those skilled in the art without departure from the invention as defined in the appended claims.

What I claim is:

1. In combination with a pair of contiguous cables each having a plurality of hollow strands, fillers inserted in the ends of the strands and a connecting sleeve constricted about the portion of the cable ends containing said fillers.

2. A cable joint comprising aligned hollow cables each having a hollow core and a plurality of hollow conductors arranged about the exterior thereof, respective fillers fitted to said core and to said conductors and a sleeve constricted about the assemblage.

3. In the joining of cables including hollow conductors, the method which comprises inserting solid fillers in the ends of each of a plurality of hollow conductors and then constricting a sleeve about the abutting portions of the cable containing such fillers.

4. The method of joining cables including hollow conductors which consists in first inserting fillers in the end of one of the hollow conductors, assembling a sleeve about such conductor, engaging the hollow conductors of the other cable with said fillers then subjecting the sleeve to a constricting action whereby it is intimately secured about the abutting ends of the cables.

5. A cable joint comprising aligned hollow cables each having a core and a plurality of hollow conductors arranged about the exterior thereof, respective fillers secured to said conductors by fused metal joints and a connecting sleeve constricted about the assemblage.

6. A cable comprising a plurality of hollow conductors, splices at intervals along the length of the cable, each splice including a filler over which the contiguous ends of the respective conductors abut, said contiguous ends being united to the fillers by fused metal joints.

7. A cable comprising a plurality of hollow conductors, splices at intervals along the length of the cable, each splice including a filler over which the contiguous ends of the respective conductors extend, said contiguous ends being united to the fillers by solder joints.

8. A cable comprising a plurality of hollow conductors, splices at intervals along the length of the cable, each splice including a metal filler over which the contiguous ends of the respective conductors extend, said contiguous ends being united with the fillers by welded joints.

9. A pair of cables aligned end-to-end and each comprising a number of strands, the ends of said strands being in abutment and alignment and a sleeve compressed on to the outer surface of each cable adjacent the abutting ends to connect said cables together.

10. An electric conductor which comprises a pair of cables aligned end-to-end and each comprising a number of hollow strands, each strand of one cable end being in abutment and alignment with a strand of the other, filler pieces within the abutting hollow ends of each pair of abutting strands and a collar compressed about the outer surface of said cable to connect said cables into a unitary structure.

11. A method of joining a pair of cables comprising hollow conductor strands which comprises bringing the ends of two cables into abutment with each hollow strand of one into alignment and abutment with the hollow strand of another while inserting a connector piece in said abutting hollow strands and thereupon compressing a collar about the abutting ends of said cables.

EDMOND S. McCONNELL.